April 16, 1940.  R. N. MILLER  2,197,729
TRACK RAIL GRINDING APPARATUS
Filed Jan. 20, 1938  10 Sheets-Sheet 8
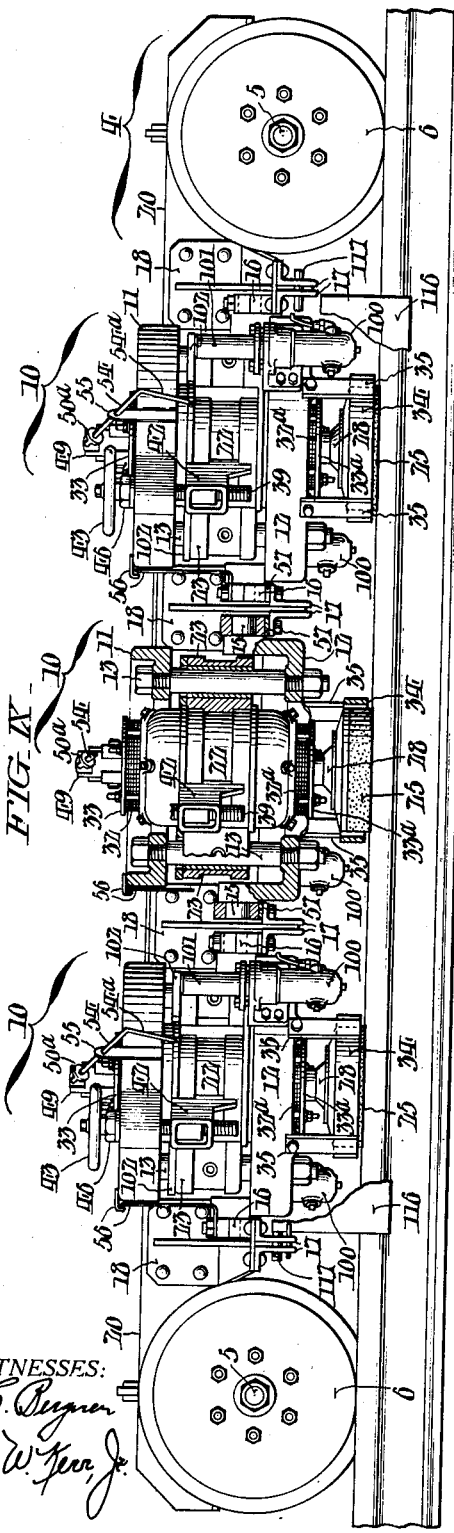
INVENTOR:
Robert N. Miller,
BY Paul & Paul
ATTORNEYS.

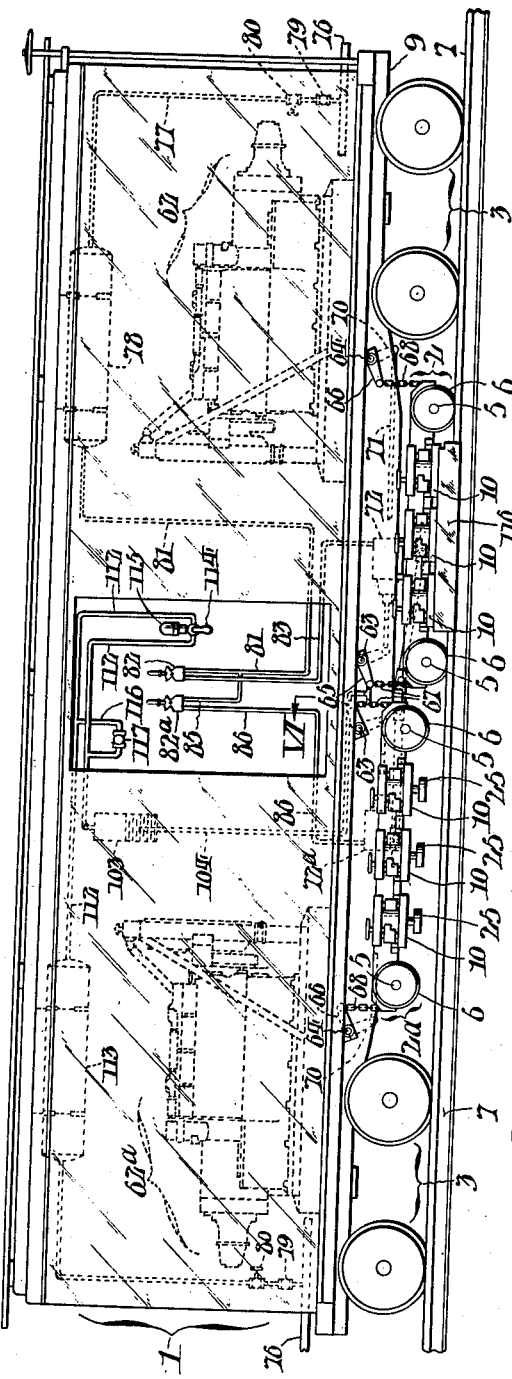

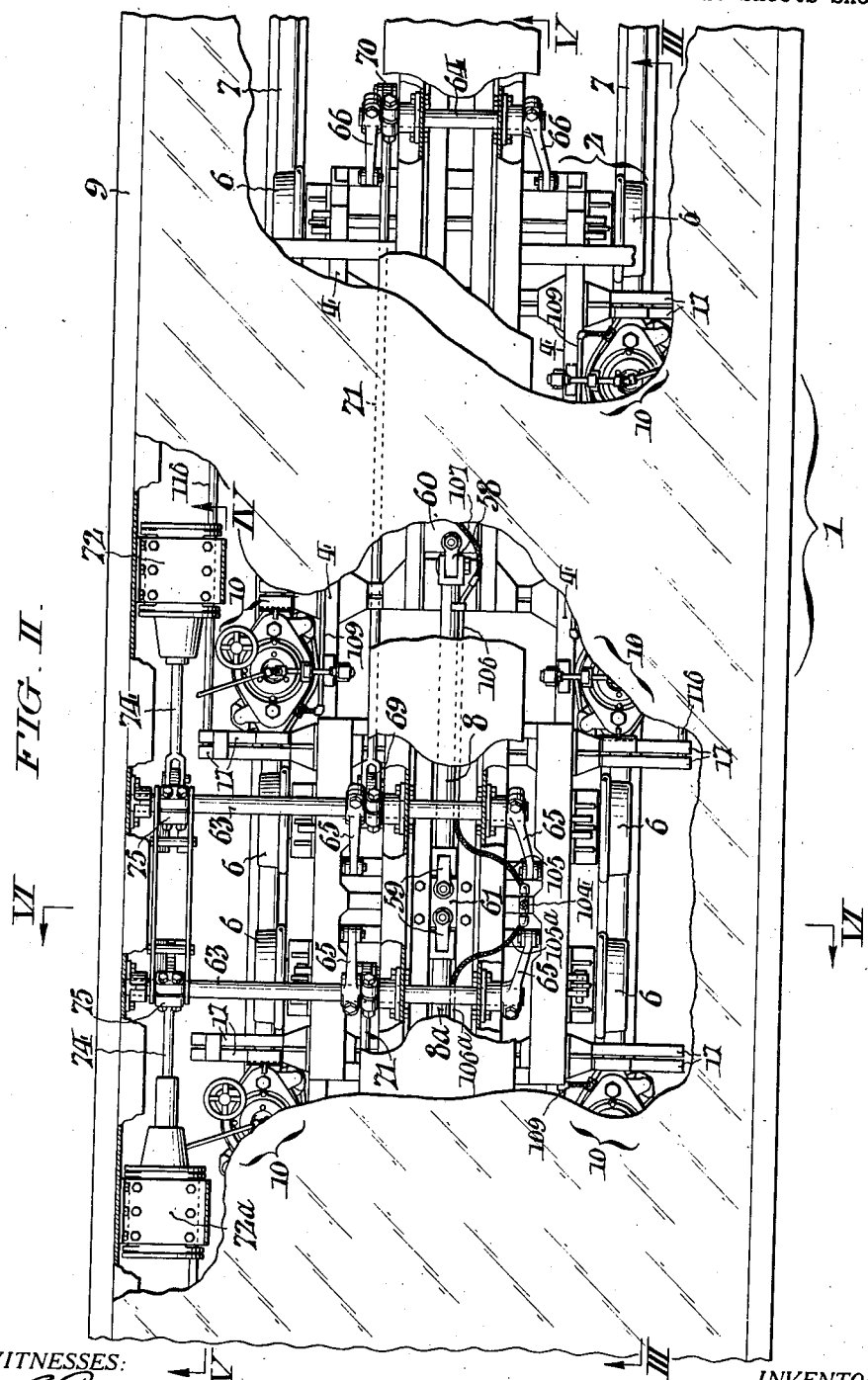

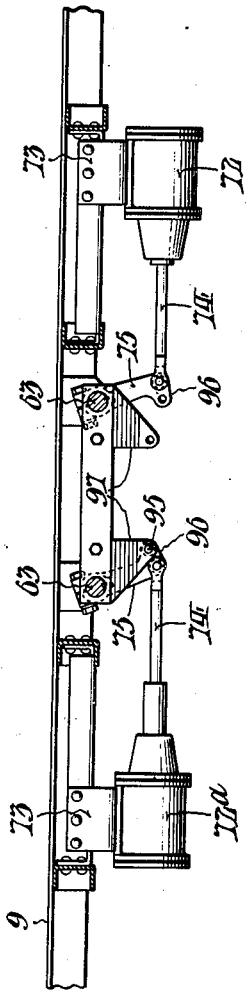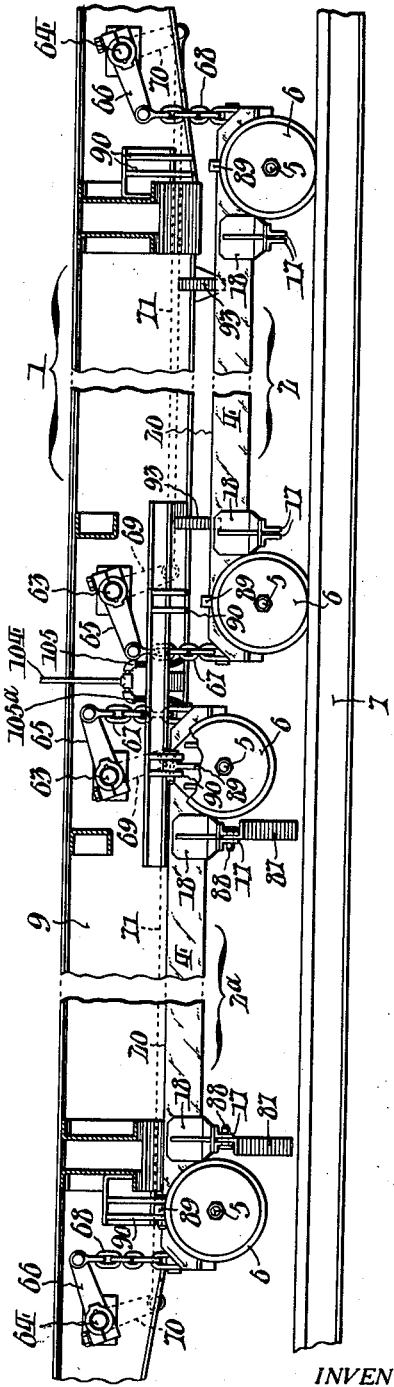

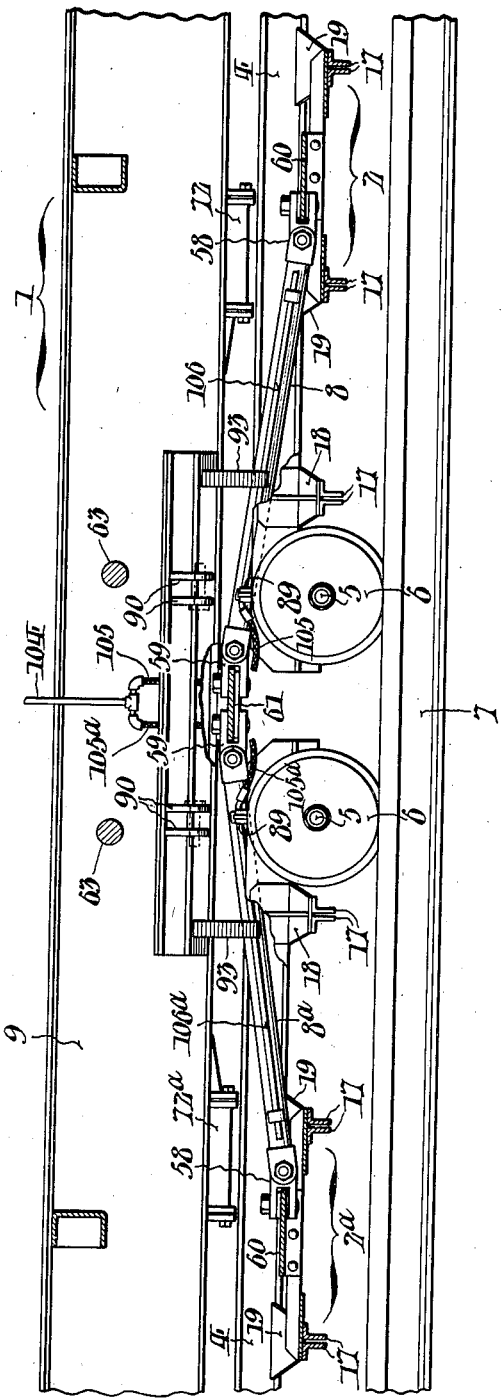

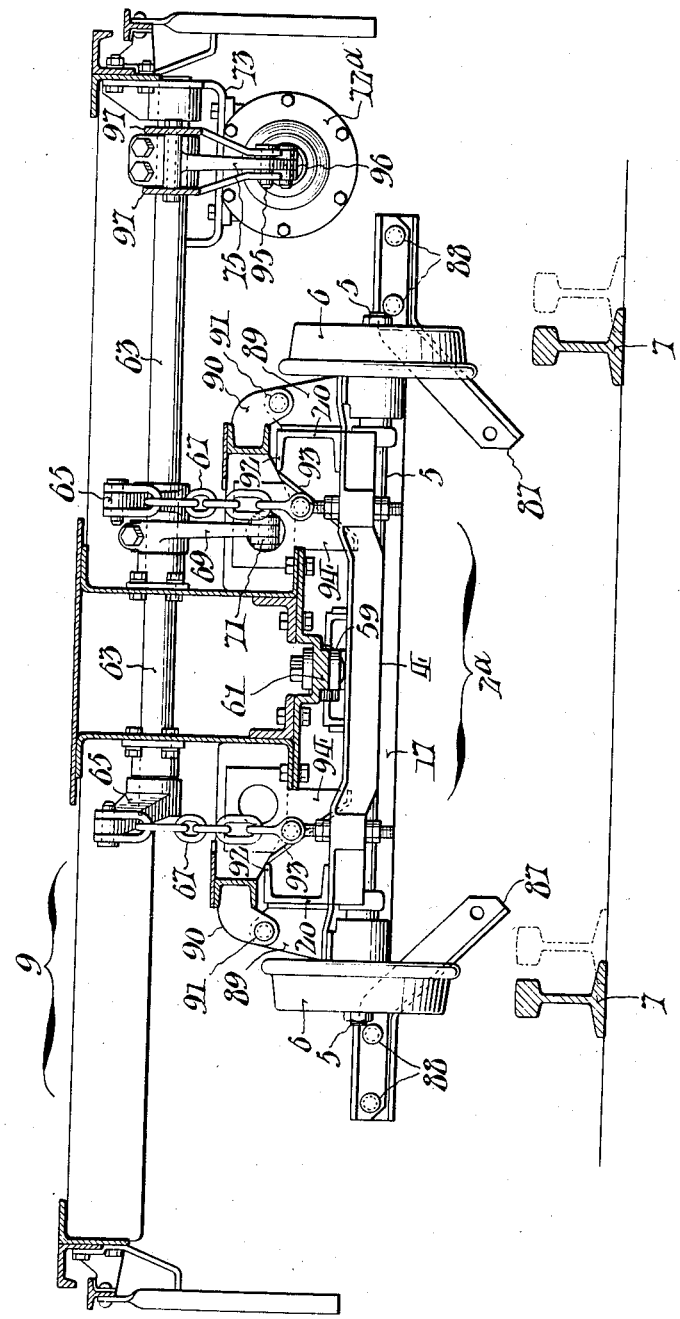

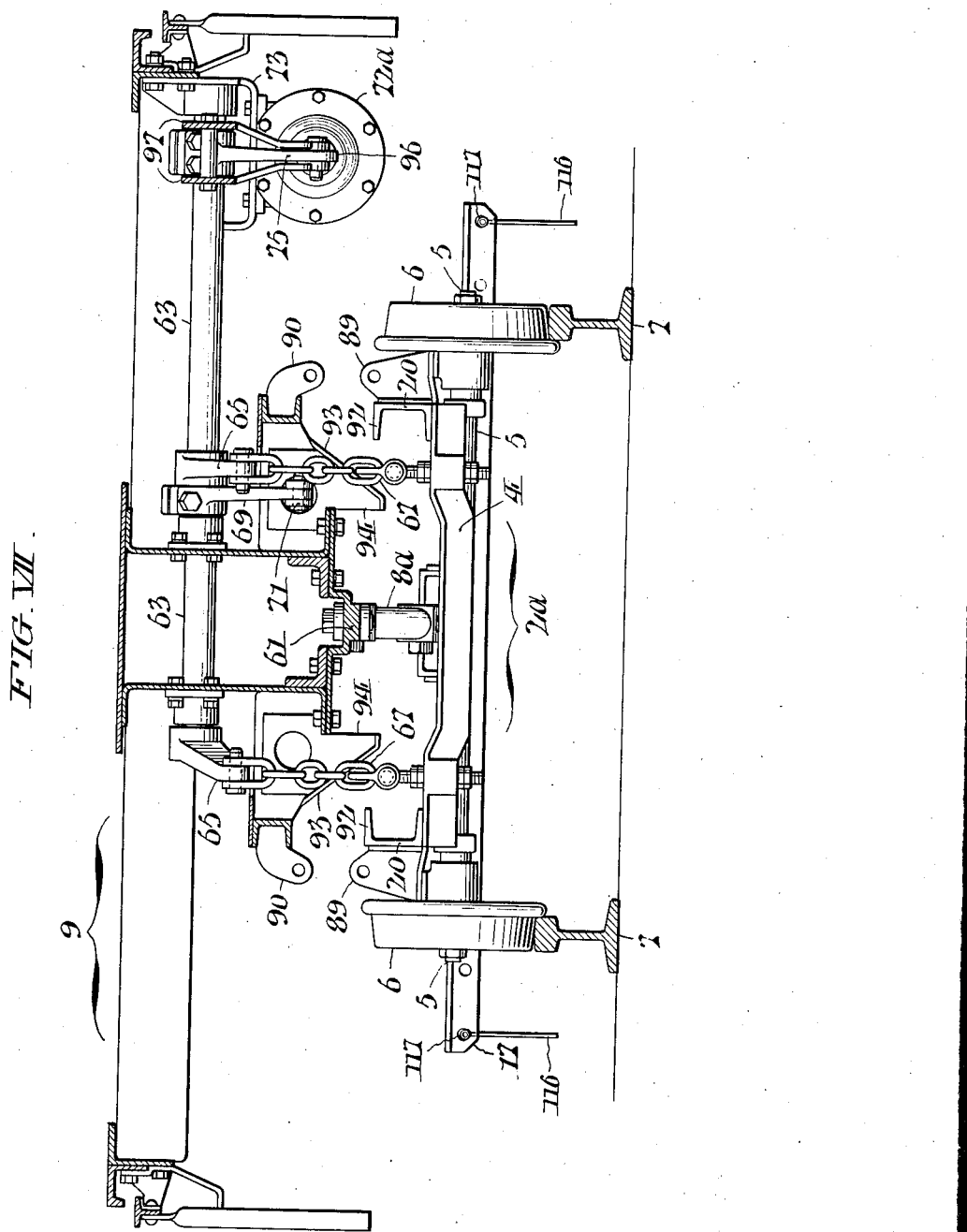

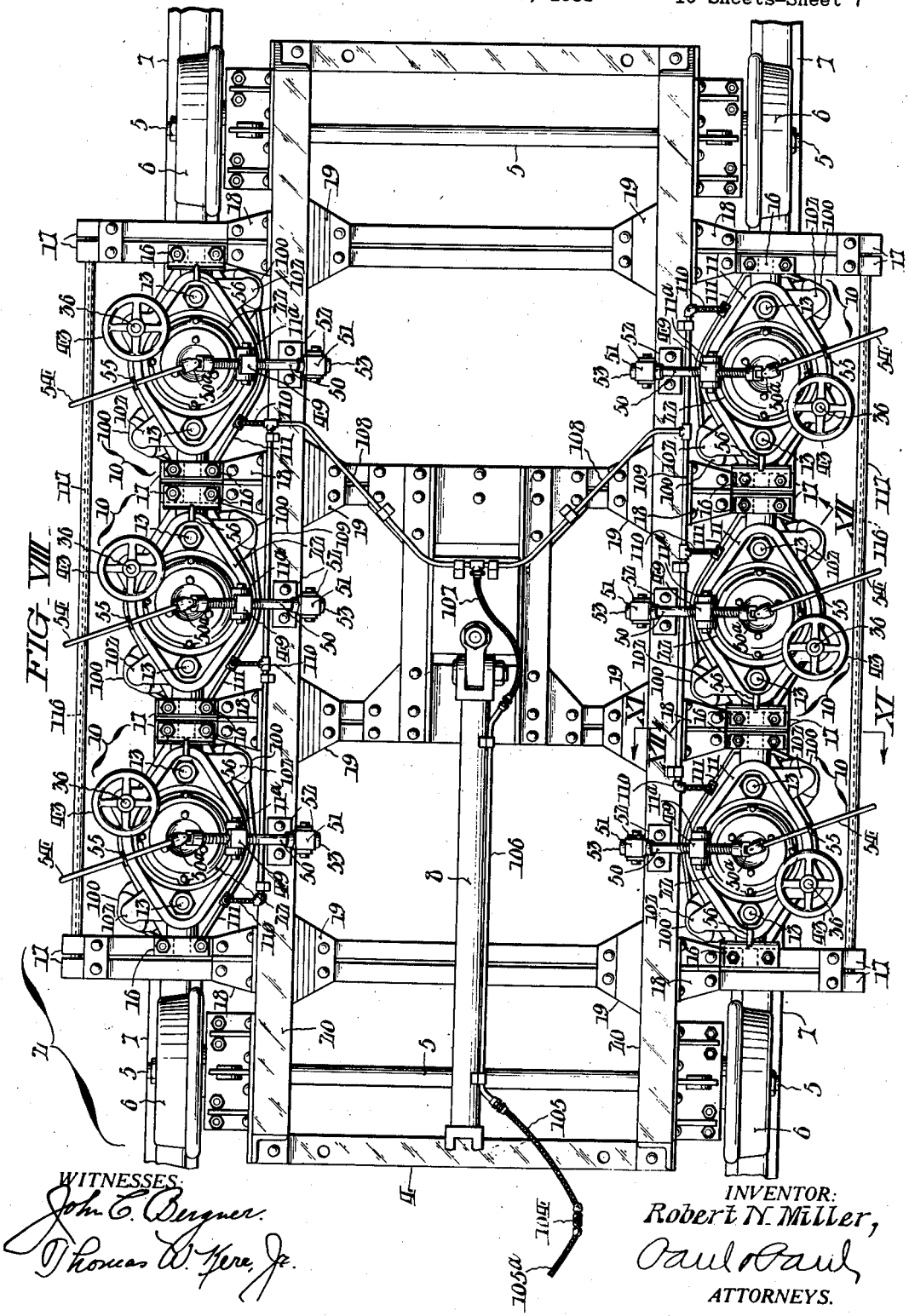

April 16, 1940. R. N. MILLER 2,197,729
TRACK RAIL GRINDING APPARATUS
Filed Jan. 20, 1938 10 Sheets-Sheet 9
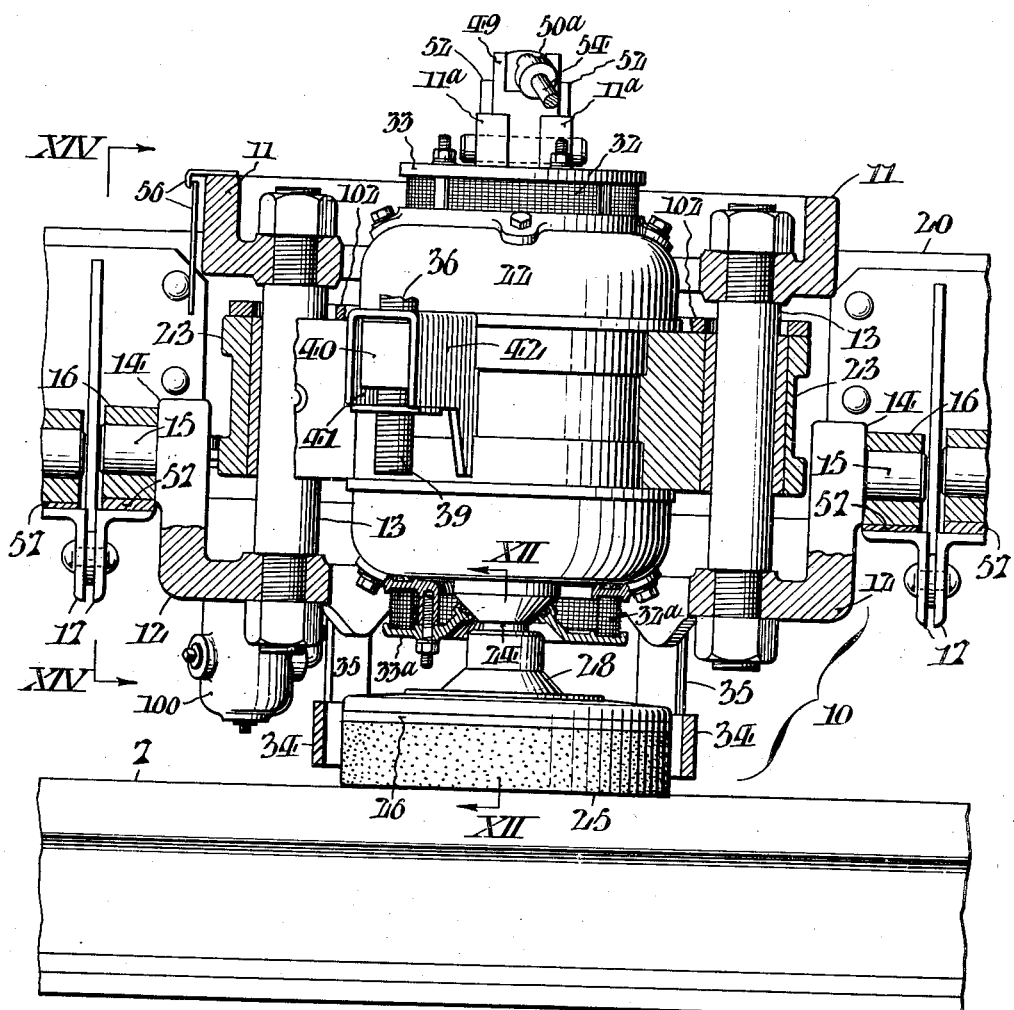
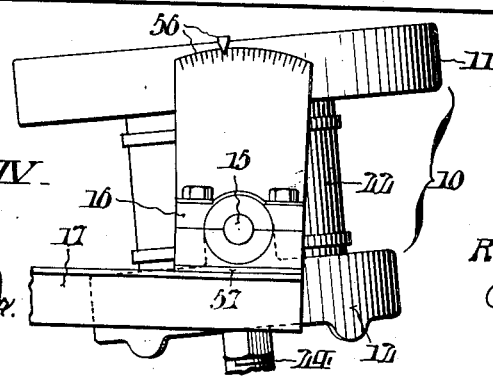
INVENTOR:
Robert N. Miller,
Paul & Paul
ATTORNEYS.

April 16, 1940.  R. N. MILLER  2,197,729
TRACK RAIL GRINDING APPARATUS
Filed Jan. 20, 1938  10 Sheets-Sheet 10
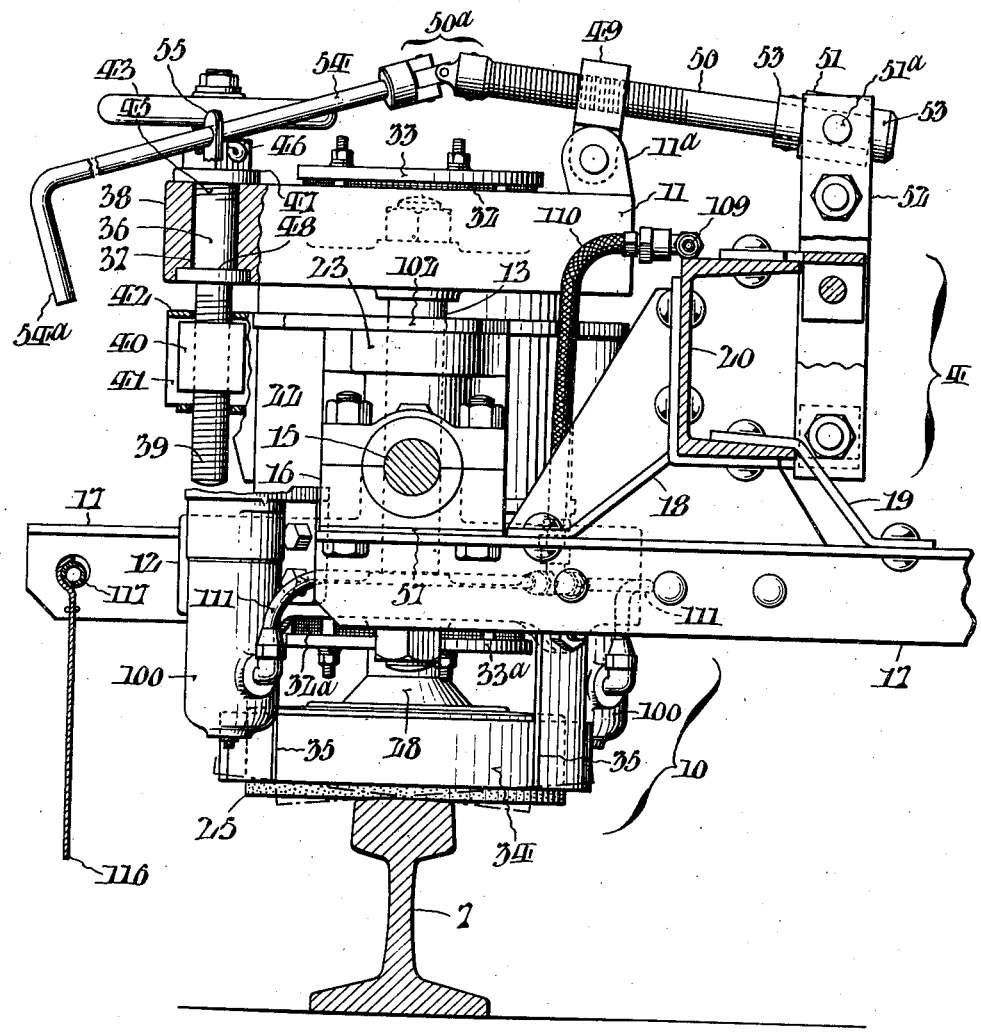
FIG. XI.
WITNESSES:
John C. Bergner
Thomas W. Kerr, Jr.
INVENTOR:
Robert N. Miller,
BY Paul & Paul
ATTORNEYS.

Patented Apr. 16, 1940

2,197,729

UNITED STATES PATENT OFFICE 2,197,729

TRACK RAIL GRINDING APPARATUS

Robert N. Miller, Lansdowne, Pa., assignor to The Pennsylvania Railroad Company, Philadelphia, Pa., a corporation of Pennsylvania Application January 20, 1938, Serial No. 185,842

13 Claims. (Cl. 51—178)

This invention relates to apparatus useful in refacing and leveling the treads of worn track rails; and it has reference more particularly to rail grinding apparatus such as disclosed in U. S. Patent No. 2,035,154, granted to Robert Faries and John G. Hartley.

In connection with apparatus of the type specifically referred to I aim to provide for angular adjustment of the grinding units transversely of the rails as well as longitudinally of the rails, so that, on the one hand, greater accuracy is attained in restoring the original configuration to the rail treads; and, on the other hand, undue wear of the abrading disks precluded through maintenance of the disks at a slight inclination to the horizontal for contact at a single circumferential point only with the rails.

Another aim of my invention is to make it possible to more accurately govern the grinding, which objective I realize in practice as hereinafter more fully disclosed, through provision of pressure fluid system with a regulatable control for variantly counterbalancing the weight of the grinding units and thereby predetermining the degree of pressure of the abrading disks upon the rail and at the same time precluding stalling of the motors.

Another object of my invention is to provide means individual to the grinding units whereby the depth of the grinding may be definitely regulated.

Another aim of my invention is to provide for control of the pressure fluid means aforesaid whereby the grinding units can be simultaneously elevated for clearance of crossovers and switches without disturbing the adjustment by which the depth of the grinding is determined.

Another object of my invention is to enable, through provision of suitable means for the purpose, raising of the carriages to clear their wheels and the grinding units from the track rails, and locking of the carriages in elevated position when the car is to be run from one location of grinding operations to another.

Another object of my invention is to provide for automatic centralization of the carriages relative to the track as they are lowered to insure proper engagement of the carriage wheels with the track rails particularly at curves.

Another object of my invention is to provide for guidance of the carriages during their elevation to predetermine registry between cooperative locking elements respectively on the car and the carriages.

A further aim of my invention is to attain the foregoing advantages with rail grinding apparatus wherein the power for the motors of the grinding units is developed by one or more electric generator sets which are carried by the transporting car, and which have a reserve capacity so that they may be utilized for supplying power to the grinding units of supplemental or auxiliary grinder cars coupled with the power car.

Other objects and attendant advantages will appear from the following detailed description of the attached drawings, wherein Fig. I shows in side elevation a railway car conveniently incorporating the rail grinding apparatus of my invention.

Fig. II is a fragmentary view of the car in plan with portions of the car body broken out to expose certain of the underlying parts of the grinding mechanism.

Fig. III is a fragmentary longitudinal section taken as indicated by the arrows III—III in Fig. II.

Fig. IV is a fragmentary longitudinal sectional view taken as indicated by the arrows IV—IV in Fig. II, showing the lifting mechanism for the grinder carriages.

Fig. V is a fragmentary longitudinal sectional view taken as indicated by the arrows V—V in Fig. II.

Fig. VI is a cross sectional view taken as indicated by the arrows VI—VI in Figs. I and II, showing one of the grinder carriages locked in raised position.

Fig. VII is a view like Fig. VI showing the grinder carriage in active or lowered position.

Fig. VIII is a view on a larger scale showing one of the grinder carriages in plan.

Fig. IX is a side elevation of the grinder carriage shown in Fig. VIII, with one of the grinder units partly in section.

Fig. X is a fragmentary view showing one of the grinding units in side elevation with portions broken out for exposure of important structural details.

Fig. XI is a detail sectional view taken as approximately indicated by the arrows XI—XI in Fig. VIII.

Fig. XII is a fragmentary diagrammatic view partly in elevation and partly in section substantially taken as indicated by the arrows XII—XII in Fig. VIII, of one of the grinder motor supports with the motor removed.

Fig. XIII is a detail sectional view on a larger scale taken as indicated by the arrows XIII—XIII in Fig. X and showing how the grinding elements are removably secured in place.

Fig. XIV is a fragmentary detail view looking as indicated by the arrows XIV—XIV in Fig. X and showing one of the scale devices which facilitate angular adjustment of the grinder units; and Figs. XV and XVI are diagrammatic views of a control valve forming part of the pressure fluid system, showing the valve in different positions.

With more detailed reference first to Fig. I of these illustrations, the numeral 1 comprehensively designates a closed railway car with which my improved rail grinding apparatus is incorporated. The car 1 may be either of a self-propelling type, or it may be of a trailer type adapted to be drawn by a locomotive. As shown, the grinding apparatus includes a pair of duplicate carriages 2, 2a which are sequentially arranged in the interval between the car trucks 3, each such carriage having a rectangular horizontal frame 4, and two axles 5 with flanged wheels 6 adapted to run on the track rails 7. By means of draw bars 8, 8a (Figs. II, V, and VII), the carriages 2, 2a are connected to the frame 9 of the car 1 with capacity for being individually raised and lowered relative to the track rails 7 in a manner later on explained.

One of the grinder carriages is illustrated on a larger scale in Figs. VI, VIII and XI to which reference will now be had. Supported at each side of the frame 4 of the carriage 2 is a longitudinally-arranged series or gang of three grinding units 10, which, in turn are exact duplicates, one of another, and each of which includes a mounting with vertically-spaced centrally open horizontal upper and lower components 11 and 12 connected by laterally-spaced vertical tie rods 13. As shown, the lower mounting component 12 has upward projections 14 at opposite ends with outwardly-extending horizontal trunnions 15 in engagement with journal blocks 16 which are supported on the projecting ends of transverse bars 17 suspended by brackets 18 and 19 from the side rails 20 of the carriage frame 4. Axially disposed within the central openings of the mounting components 11 and 12 is an electric motor 22 with laterally projecting guide ears 23 on its casing slidingly engaging the tie rods 13, see Figs. IX, X and XI. At the lower end of each motor shaft 24 (Figs IX and XIII) is a grinding element in the form of an axially-open abrasive disk 25 which is adapted to bear downward on the head of the corresponding track rail 7. The grinding disks 25 are preferably of the Bakelite or rubber impregnated type which do not require the use of a fluid coolant. As exemplified in Fig. XIII, each grinding disk 25 is backed by a metal plate 26, and is removably secured by a plurality of cap screws 27 threadedly engaging into the backing plate, to a disk head 28 which is in turn secured by a nut 29 to the tapered portion 30 of the motor shaft 24 and fixed against independent rotation thereon by a key 31. This arrangement obviously permits ready replacement of worn grinding disks by new ones when necessary. Suitably secured to the top and bottom of the casing of each motor 22 with interposition of annular screens 32, 32a (see Figs. IX and X), are coaxial protective shield plates 33, 33a respectively; and surrounding each grinding disk 25, is an annular guard 34 which is supported by suspension straps 35 from the lower mounting component 12 of the grinding unit.

By virtue of the screens 32, 32a cooling air is permitted to circulate freely through the motor casings to the exclusion of the dust or grit resulting from the grinding.

In order that the depth of the grinding may be regulated, there is provided in connection with each of the units 10, an adjustable stop means which limits the downward movement of the motor 22. From Fig. XI, it will be observed that this stop means comprises a vertical screw spindle 36 which passes freely down through an opening 37 in a lug 38 on the upper mounting component 11 of the grinding unit 10, and which has threads 39 at its lower end engaging a nut block 40 confined against rotation in the hollow 41 of a projecting lug 42 on the casing of the motor 22, the vertical depth of the block being less than that of the hollow to permit the requisite up and down play of the unit during the grinding. To the top of the screw spindle 36 is affixed a hand wheel 43; and immediately below said hand wheel the spindle has threads 45 engaged by a castellated nut 46 which bears upon a friction washer 47 on the top of the lug 38, and which serves, by coaction with a friction collar 48 on the spindle bearing on the bottom of said lug, to impose binding restraint upon said spindle to hold it against accidental rotation in adjusted positions.

Pivotally connected at one end between upstanding ears 11a on the upper mounting component 11 of each grinding unit 10 is a nut lug 49 for a screw bolt 50 which extends horizontally inward of the grinder carriage 4 and passes freely through a swivel block 51 whereof the horizontally aligned trunnions 51a are journaled in a bearing bracket 52 on the carriage frame 4. Fixed on the bolt 50 are spaced collars 53 which respectively bear against opposite sides of the swivel block 51. The screw bolt 50 is operable by means of a rod 54 which is coupled to the bolt by a universal joint at 50a and which passes loosely through a bearing clip 55 affixed to the upper mounting component 11. The angularly bent outer end 54a of the rod 54 serves as a manipulating handle. As a consequence of this construction, it is possible to swing the grinding unit 10 on its pivot trunnions 15 so that the axis of the motor 22 may be inclined to either side of the central vertical longitudinal plane of the corresponding track rail 7 such adjustments being facilitated with the aid of the scale and pointer means shown at 56 in Figs. XI and XIV.

As shown in Fig. X, shims 57 of different thickness are interposed beneath the opposite bearing blocks 16 for each grinding unit 10 so that the latter is set at a very slight tilt longitudinally of the track rails 7. As a result, the edge of the grinding disk 25 will bear on the rail at a single point only.

In practice, one of the grinding units 10 at each side of each of the carriages 2, 2a is set in true vertical position and the other two set in oppositely tilted positions relative to the central vertical longitudinal planes of the rails 7, with the result that the top surfaces or treads of said rails are simultaneously ground substantially to a transversely convexed profile in simulation of their original shape, incident to travel of the car 1. For relatively light grinding operations, either of the carriages may be used alone. On the other hand, in instances where the rails are badly worn so that proper leveling requires deeper grinding, both carriages are used with the grinding units on the one adjusted for ability to drop somewhat lower than the units of the other, the grinding being thus effected stage-wise or progressively without necessitating repeated overtravel of the rails as would otherwise be the case.

Each of the draw bars 8, 8a hereinbefore referred to has its opposite ends connected, as shown in Figs. II and V, by universal pivot means 58 and 59 with plates 60 and 61 respectively centrally affixed to the tops of the frames 4 of the corresponding grinder carriages 2, 2a and to the bottom of the frame 9 of the car 1. By virtue of these universal pivots, the grinder carriages 2, 2a are free to rise and fall, as well as to shift laterally in adapting themselves to the track rails 7.

The electric power for driving the grinder motors 22 of the two carriages 2 and 2a is in the present instance obtained from separate internal combustion motor-generator sets which are respectively designated comprehensively by the characters 62 and 62a in Fig. I and shown as located within the body of the car at opposite ends thereof; and means (not illustrated) are provided whereby the motors 22 can be separately controlled from within the car 1. However, any other suitable power supply arrangement may be utilized if found desirable or convenient in lieu of that shown herein by way of illustration.

The lifting mechanism for each grinder carriage 2, 2a comprises a pair of transverse rock shafts 63, 64 (Figs. I–IV, VI and VII) which are journaled in suitable bearings on the car frame 9 and whereto are secured laterally-spaced suspension arms 65 and 66 from which said carriages are hung at opposite ends by means of chains 67, 68. Also affixed to the shafts 63, 64 are coordinating arms 69, 70 which are connected by means of link rods 71 to determine unison operation of said shafts. Power for lifting the grinder carriages 2, 2a is obtained through pressure fluid cylinders 72, 72a which are supported by suspension brackets 73 beneath the car frame 9, the piston rods 74 of said cylinders being connected directly to actuating arms 75 on the shafts 63, see Figs. II, IV, VI and VII. Pressure fluid, i. e., compressed air, is received from the train air brake line pipe indicated at 76 in Fig. I through a connecting pipe 77 and stored in a reservoir 78 suspended from the ceiling of the car. Interposed in the pipe 77 is a check valve 79 to prevent return flow into the line pipe 77, and a hand control valve 80. From the reservoir 78 a pipe 81 leads to an operating valve 82, which, in turn, communicates, through another pipe 83 with the cylinder 72; while a branch 85 from the pipe 81 conducts the compressed air to another valve 82a for controlling the cylinder 72a, said valve 82a being in communication with said cylinder through another pipe 86. The valves 82 and 82a are preferably of a type such as ordinarily used for controlling car brakes. By proper manipulation of the valves 82, 82a air is admitted to or discharged from the cylinders 72, 72a to raise or lower the grinder carriages 2, 2a after a manner which will be readily understood from the drawings.

To insure proper centralization of the grinder carriages 2, 2a in relation to the track, particularly at curves, there is provided a guide means including angular brackets 87 (see Figs. III, VI and VII) which are removably secured by means of pins 88, to the projecting ends of certain of the transverse bars 17 of the carriage frames 4 with their free ends oppositely inclined at complementary angles inwardly of said frames. During lowering of the carriages 2, 2a the guides 87 coact with the track rails 7 to shift the carriage laterally in one direction or the other as may be required. Thus, for example in Fig. VI, if the relation of the track rails 7 to the car 1 at a curve be as indicated in dot and dash lines, the guide 87 at the left will engage the corresponding rails 7 and cause the grinder carriage to be shifted to the right until it is centered over the track, such shifting being permitted by reason of the universal pivots of draw bar 8 and the flexibility of suspension chains 67, 68. After the grinder carriage is lowered, the guides 87 are removed to preclude fouling of switches by them during travel of the car 1 on the rails.

The means for locking the grinder carriages 2, 2a in raised position to avoid strain on the lifting mechanism incident to travel of the car 1 from one location of grinding operations to another is as follows: Secured respectively to each carriage 2, 2a and to the car frame 9 are complemental locking elements 89 and 90 which are adapted to interengage as shown in Figs. III and VI, and which are pierced for passage of removable keeper bolts 91. Registry between the cooperating locking elements 89 and 90 during the lifting of the grinder carriages is pre-assured by coaction of ledges 92 provided by side rails 20 on the frames 4 with the inclined edges 93 of guide members 94 on the frames 9 of the car 1, see Figs. VI and VII. To further safeguard the lifting mechanism with the grinding carriages 2, 2a elevated, the actuating arms 75 on the rock shafts 63 are locked against movement by keeper pins 95 passed through apertures in lateral ears 96 of said arms and through registering openings in pendant brackets 97 on the car frame 9, as instanced at the left of Fig. IV.

In order that the downward pressure of the grinding disks 25 may be controlled and stalling of the motors 22 prevented, I have provided means for counterbalancing said motors to the desired extent. This means includes in each instance, a pair of vertically-arranged hydraulic cylinders 100 which are bolted respectively to opposite sides of the lower component 12 of the motor mounting (Figs. IX–XII) at diametrically opposite points in respect to the motor axis. Slidable in the cylinders 100 are piston plungers 101 which react upwardly upon lateral plate projections 102 on the guide ears 23 on the motor 22. Suitably supported within the body of the car 1 is a vertical tank 103 (Fig. I) which is partially filled with hydraulic fluid preferably of a non-freezing type such as lubricating oil; and leading downward from the bottom of this tank is a pipe 104 which, through flexible hoses 105, and 105a (Fig. VIII), is connected to distribution pipes 106, 106a respectively attached to the links 8, 8a (Fig. II). Each of the distribution pipes 106, 106a is in turn connected as exemplified in Fig. VIII, by another flexible hose 107, to a transverse pipe 108 affixed to the top of the frame 4 of the corresponding grinder truck, said transverse pipe having longitudinally extending branches 109 which are respectively common to the grinding units 10 at opposite sides of such truck. The hoses shown at 110 in Fig. VIII constitute flexible connections between the pipe 109 and manifold pipes 111 extending between the cylinders 100 of the grinding units 10 of the groups at opposite sides of the trucks 2, 2a. Referring again to Fig. I, a pipe 112 extends to the top of the tank 103 from another reservoir 113 within the car, said reservoir, like the reservoir 78 hereinbefore referred to, being in communication with the train brake line pipe 76. Interposed in the pipe 112 is a three-way hand valve 114 which exhausts through a regulatable relief or safety valve conventionally indicated at 115. Connected across the parallel horizontal runs of the pipe 112 (Fig. I) is a pipe 116 wherein is interposed a suitable adjustable feed or pressure regulating valve such as is ordinarily used for low pressure gas control, said valve being conventionally indicated at 117. By virtue of this arrangement, a head of air under definite pressure, lower than that of the air in the tank 113, is normally maintained above the oil in the reservoir 103 for action, through the medium of the oil, upon the pistons 101 in the hydraulic cylinders 100 associated with the several grinding units 10 to hold said units counter-balanced to the desired degree with the grinding wheels bearing, with uniform pressure, on the rails. With the hand valve 114 normally positioned as in Fig. XV, it will be seen that pressure in excess of the setting of the feed valve 117 is permitted to escape through the relief valve 115. By adjusting the feed valve 117, it is possible to vary the influence of the pressure upon the grinding disks 25 and so control the depth of the grinding during passage of the car 1 over the rails. When it is desired to momentarily lift the grinding wheels from the rails for clearance of crossings and switches without lifting the grinding trucks 2, 2a, the hand valve 114 is turned from the normal position shown in Fig. XV to the position shown in Fig. XVI with consequent admission of additional pressure from the reservoir 113, by way of the pipe 112, into the tank 103 whereby the weight of said units is entirely overcome. When the hand valve 114 is subsequently moved back to its original position, such additional pressure is exhausted through the bleed valve 115 down to the pressure determined by the setting of said bleed valve so that the grinding units 10 are permitted to move down to their normal positions counter-balanced, as before, by the action of the oil. The combined use of air and oil as pressure media is advantageous in that it affords a flexibility of control which cannot be attained with either alone. The oil moreover insures against freezing of the control system and serves in the additional capacity as a lubricant to preclude wear of the cylinders 100 and their plungers 101.

As an additional means for keeping sparks within the confines of the track during the grinding, I have provided guards or shields 116 which may be of sheet metal or asbestos, and which, as shown in Figs. I and VII–IX, are suspended from pipe rods 117 engaged in the outer bolt holes at the ends of a transverse member 17 of the grinder truck frames 4 so as to hang in front of the grinder truck units 10 at opposite sides of the grinder trucks 2, 2a. The shield supporting rods 117 are arranged so as to be removable from the grinder trucks 2, 2a when the gauge bars 87 are to be used.

It is to be understood that my invention is not restricted to the precise number of grinder carriages nor to the exact number of grinding units herein shown by way of example, since these may be increased or decreased as may be found convenient or desirable in practice. Furthermore, my invention comprehends the use of motor generator sets having a capacity in excess of that required for the grinding units associated with the car 1, so that a power supply is available for grinding units carried by supplemental or auxiliary cars coupled with the power car. Again, through provision of suitable additional piping connections, the pneumatic-hydraulic counterbalancing system of the "mother" car may be utilized for controlling the grinding units of the auxiliary grinder cars, and the pneumatic lifting system of the power car utilized for elevating the grinder trucks of the auxiliary cars for travel of the train from one field of grinding operation to another.

Having thus described my invention, I claim:

1. Rail grinding apparatus comprising a railway car with a horizontal frame supported by wheeled trucks; a wheeled carriage in the interval between a pair of trucks on the car having a horizontal frame supporting at each side thereof a plurality of serially-arranged grinding units each with a grinding element adapted to bear on the corresponding track rail; and a draw bar by which the grinder carriage is coupled with the car, said bar having a universal pivotal connection at one end with the car frame at a point in the longitudinal center of the latter, and a similar pivotal connection at its opposite end at a point in the longitudinal center of the grinder track frame.

2. Rail grinding apparatus comprising a railway car; a wheeled carriage supporting at each side thereof a plurality of serially-arranged grinding units each with a grinding element rotative about a vertical axis and adapted to bear on the corresponding track rail; means whereby the carriage is connected to the car in the interval between a pair of trucks of the latter with capacity for being raised to clear its wheels and the grinding elements from the rails; means for elevating and lowering the carriage; guide means on the carriage adapted, by coaction with the track rails during lowering of said carriage, to automatically centralize the latter in respect to said rails.

3. Rail grinding apparatus comprising a railway car; a wheeled carriage supporting at each side thereof a plurality of serially-arranged grinding units each with a grinding element rotative about a vertical axis and adapted to bear on the corresponding track rail; means whereby the carriage is connected to the car in the interval between a pair of trucks of the latter with capacity for being raised to clear its wheels and the grinding elements from the rails; means for elevating and lowering the carriage; and complementarily-inclined guides on the carriage adapted, by coaction with the rails during lowering of said carriage, to automatically centralize the latter in respect to said rails.

4. Rail grinding apparatus comprising a railway car; a wheeled carriage supporting at each side thereof a plurality of serially-arranged grinding units each with a grinding element rotative about a vertical axis and adapted to bear on the corresponding track rail; means whereby the carriage is connected to the car in the interval between a pair of trucks of the latter with capacity for being raised to clear its wheels and the grinding elements from the rails; means for elevating and lowering the carriage; and complemental locking elements respectively on the car frame and on the grinder carriage; and guide means adapted, during elevation of the carriage, to bring the locking elements into registry.

5. Rail grinding apparatus comprising a railway car; a wheeled carriage supporting at each side thereof a plurality of serially-arranged grinding units each with a grinding element rotative about a vertical axis and adapted to bear on the corresponding track rail; means whereby the carriage is connected to the car in the interval between a pair of trucks of the latter with capacity for being raised to clear its wheels and the grinding elements from the rails; means for elevating and lowering the carriage; complemental locking elements respectively on the car frame and on the grinder carriage; and guide elements on the car with inclined cam surfaces adapted, by coaction with ledges on the grinder carriage, to bring the locking elements into registry.

6. In rail grinding apparatus, a vertically arranged motor with an abrading element affixed to the lower end of its shaft; a carriage movable along the rail; a mounting connected to the carriage by which the motor is floatingly supported for capacity to move up and down with the abrading element bearing on the rail; and adjustable means for limiting the downward movement of the motor to predetermine the depth of grinding including a screw spindle confined to rotation in the mounting; a nut block on the spindle restrained against rotation within a lateral hollow of the motor casing, the vertical dimension of the nut being less than that of the hollow, and friction means for holding the spindle against accidental displacement in adjusted positions.

7. Rail grinding apparatus comprising a carriage movable along the rail; a grinding unit including a vertically-arranged motor with a grinding wheel at the lower end of its shaft; guide means on the carriage by which the grinding unit is confined with freedom of axial up and down movement with the grinding wheel resting on the rail under the weight of the motor; regulatable means on the mounting for positively limiting the downward movement of the grinding movement to predetermine the depth of cut made in the rail; and means for partly counterbalancing the weight of the grinding unit including a hydraulic cylinder with its piston connected to the motor, a reservoir for hydraulic fluid in communication with one end of the cylinder for action of the fluid upon one side only of the piston, and regulatable means for admitting compressed air into the reservoir to influence the hydraulic fluid.

8. Rail grinding apparatus comprising a carriage movable along the rail; a grinding unit including a vertically-arranged motor with a grinding wheel at the lower end of its shaft; guide means on the carriage by which the grinding unit is confined for freedom of axial up and down movement with the grinding wheel resting on the rail under the weight of the motor; regulatable means for positively limiting the downward movement of the grinding unit to predetermine the depth of cut made in the rail; and means for partly counterbalancing the weight of the unit including a hydraulic cylinder with its piston connected to the unit, a reservoir partially filled with hydraulic fluid in communication with the cylinder at one end to act upon but one side of the piston, piping for conducting compressed air into the reservoir above the level of the hydraulic fluid; a three-way control valve interposed in the piping, whereby, upon movement to one position, compressed air may be admitted at regulatable moderate pressure during grinding operations, and when moved to another position the compressed air is admitted to the reservoir at full pressure for lifting the grinding unit clear of the rail.

9. Rail grinding apparatus comprising a carriage movable along the rail; a driven grinding element adapted to bear upon the rail under its own weight; a guide on the carriage by which the grinding element is confined with freedom for up and down movement; regulatable means for positively limiting the downward movement of the grinding element to predetermine the depth of cut made in the rail; and means for partly counterbalancing the weight of the grinding element including a hydraulic cylinder with its piston connected to the motor, a reservoir for the hydraulic fluid in communication with one end of the cylinder for action of the fluid upon one side only of the piston, and regulatable means for admitting compressed air into the reservoir to influence the hydraulic fluid.

10. Rail grinding apparatus according to claim 7, in which the guide is pivotally mounted, and in which regulatable means is provided to move the guide on its pivot for angular adjustment of the grinding element laterally of the rail.

11. Rail grinding apparatus comprising a carriage movable along the rail; a series of driven grinding elements each adapted to bear upon the rail under its own weight; guide means on the carriage by which the grinding elements are confined with freedom for independent up and down movement; means individually associated with said elements whereby the extent of their downward movement may be variously limited to determine the depth of the cut made by each for the purpose of progressive grinding incident to a single pass of the carriage over the rails; and means whereby the weight of the grinding elements may be partly counterbalanced to vary the grinding pressure, including individual hydraulic cylinders with their pistons respectively connected to the grinding elements, a common reservoir for hydraulic fluid in communication with one end of each of the cylinders for action of the fluid upon one side only of the corresponding piston, and regulatable means for admitting compressed air into the reservoir to influence the hydraulic fluid and so simultaneously control the several cylinders.

12. Rail grinding apparatus according to claim 11 further comprising means whereby said elements may be simultaneously lifted from the rail without disturbing their individual adjustment for depth grinding.

13. Rail grinding apparatus comprising a carriage movable along the rail; a series of driven grinding elements each adapted to bear upon the rail under its own weight; individual pivotally-mounted guides on the carriage by which the grinding elements are confined with freedom for independent up and down movement; regulatable means whereby the guides may be independently moved on their pivots for annular adjustment of the rail grinding elements laterally of the rail; means individually associated with the elements whereby the extent of their downward movement may be variously limited to determine the depth of the cut made by each for the purpose of progressive grinding incident to a single pass of the carriage over the rails; and means whereby the weight of the grinding elements may be partly counterbalanced to vary the grinding pressure, including individual hydraulic cylinders with their pistons respectively connected to the grinding elements, a common reservoir for hydraulic fluid in communication with one end of each of the cylinders for action of the fluid upon one side only of the corresponding piston, and regulatable means for admitting compressed air into the reservoir to influence the hydraulic fluid and so simultaneously control the several cylinders.

ROBERT N. MILLER.